United States Patent [19]

Wokeck

[11] 4,299,160
[45] Nov. 10, 1981

[54] CORN POPPER

[75] Inventor: Glenn F. Wokeck, Geneva, Mich.

[73] Assignee: Bangor Plastics, Inc., Bangor, Mich.

[21] Appl. No.: 116,363

[22] Filed: Jan. 28, 1980

[51] Int. Cl.³ .............................................. A23L 1/18
[52] U.S. Cl. ........................... 99/323.5; 219/10.55 E; 220/4 B; 220/94 A; 99/DIG. 14
[58] Field of Search ................. 99/323.4, 323.5, 323.8, 99/DIG. 14, 444, 425; 219/10.55 E; D7/95; 220/4 B, 94 A, 70

[56] References Cited

U.S. PATENT DOCUMENTS

| | | | |
|---|---|---|---|
| D. 255,533 | 6/1980 | Lange | D7/85 |
| 3,464,579 | 9/1969 | Asenbauer | 220/4 B |
| 3,847,067 | 11/1974 | Munsey | 99/323.8 |
| 4,149,455 | 4/1979 | Ross | 99/323.5 |
| 4,158,760 | 6/1979 | Bowen | 99/323.5 |

FOREIGN PATENT DOCUMENTS 1487962  5/1967  France ............................ 220/4 B

*Primary Examiner*—Robert W. Jenkins
*Attorney, Agent, or Firm*—Blanchard, Flynn, Thiel, Boutell & Tanis

[57] ABSTRACT

A receptacle for popping corn in a microwave oven has (1) a quadrilateral bowl with upwardly diverging side walls comprising a material through which microwaves can readily pass and (2) a cover having four side walls, a top wall and an edge portion, said cover being removably mountable upon the upper rim of the bowl and being likewise of a material permeable to microwave energy. Leg means support the bowl and said bowl has handle means at opposite ends thereof. A drip lip on the inner side of the edge portion of the cover means prevents the escape of liquid which condenses or splashes onto the inner surface of the cover means during a popping operation.

5 Claims, 7 Drawing Figures

CORN POPPER

BACKGROUND OF THE INVENTION

This invention relates in general to a corn popper for use in a microwave oven and, more particularly, to a type thereof having bowl means and cooperating cover means which are so designed as to enhance the popping operation with a minimum of inconvenience.

Existing receptacles for use in popping corn within a microwave oven are not entirely satisfactory. Some of such receptacles fail to pop a substantial portion of the kernels placed in the popper. Other such receptacles permit the liquids produced during the popping operation to escape from the receptacles and foul the inside walls of the oven. Many such poppers are not equipped with manually engageable means for removing the popper from the oven after the corn has been popped. This can produce a painful experience where the corn popper has been used several times and has become heated by the popped corn and unpopped kernels therein.

Accordingly, the objects of the invention include:

1. To provide a popcorn popper adaptable for use in a microwave oven which will be simple in structure and effective in operation.

2. To provide a popcorn popper, as aforesaid, of such structure as to be moldable by injection molding methods without excessive mold expense, by way of example.

3. To provide a popcorn popper, as aforesaid, including provision for retaining liquids produced during the popping operation within the popping container.

4. To provide a popcorn popper, as aforesaid, including means enabling same to be manually handled immediately, or at least shortly, following a popping operation.

5. To provide a popcorn popper, as aforesaid, which is of sufficiently regular and open shape as to be easily cleaned following a popping operation.

6. To provide a popcorn popper, as aforesaid, in which at least a portion thereof may function as a serving dish for the popcorn if desired following a popping operation.

Other objects and purposes of the invention will be apparent to persons acquainted with devices of this general type upon reading the following specification and inspection of the accompanying drawings.

DETAILED DESCRIPTION

Figure 1:
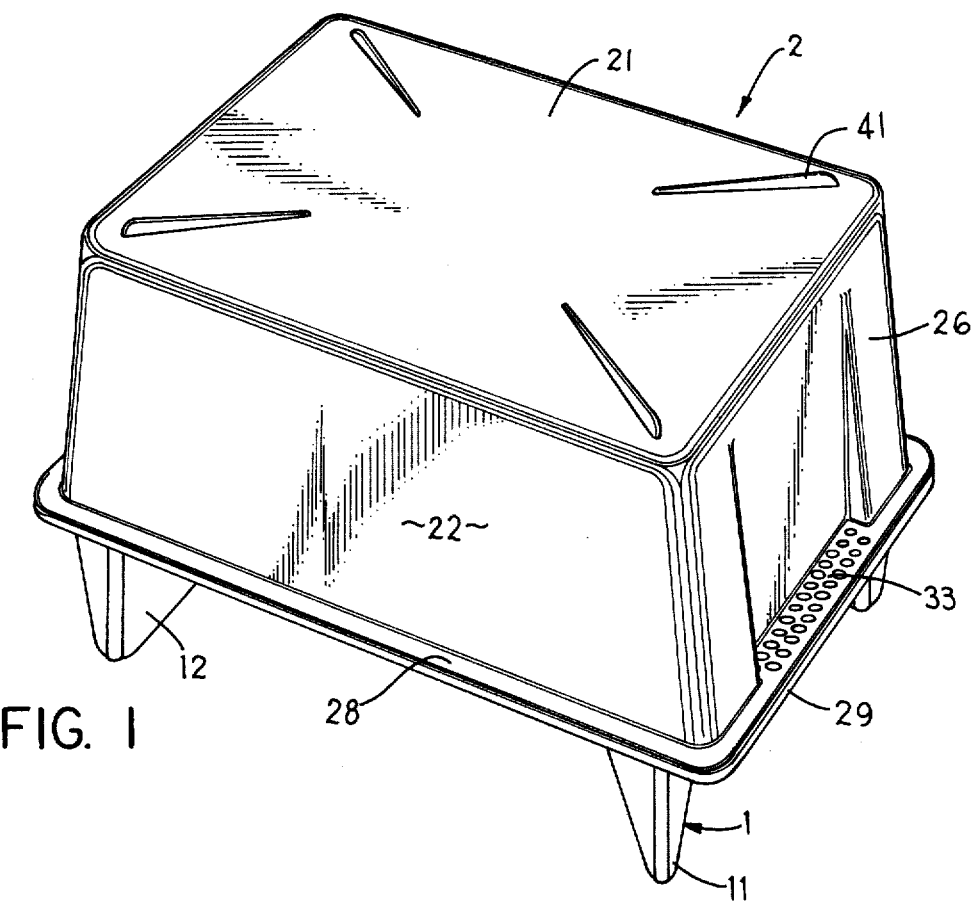
FIG. 1 is an oblique view of the popcorn popper in assembled condition.
Figure 2:
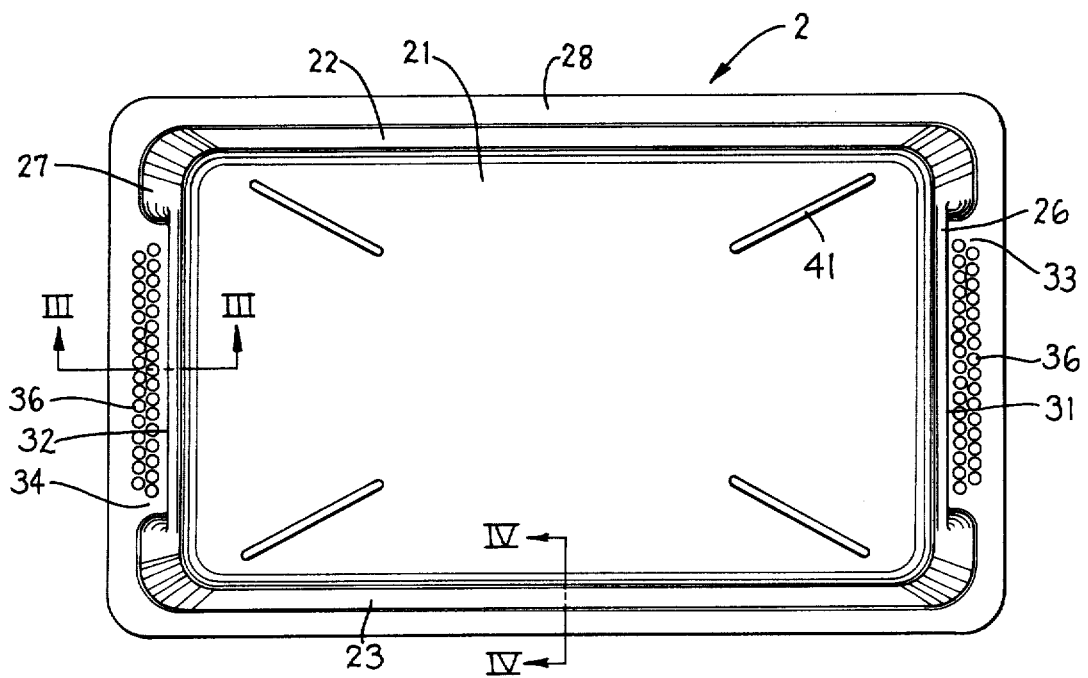
FIG. 2 is a top view of the assembly shown in FIG. 1.

The popcorn popper of the invention comprises a base 1 and cover 2. Said components are made preferably by injection molding methods, from appropriate known plastics materials through which microwaves can pass freely, with the base 1 being normally of a material opaque to visible light and the cover 2 being preferably of a material transparent to visible light. As examples, the base 1 may be made from polysulfone and the cover 2 may be made from polysulfone.

The base 1 in the illustrated embodiment comprises a receptacle 3 having planar downwardly converging sides 6, 7, 8 and 9. The slope of said sides with respect to the horizontal may be widely variable but is preferably something between about 15° and about 50°, here approximately 30°. Firmly fixed, here integrally molded, to the said receptacle are four legs 11, 12, 13 and 14. Said legs are in this embodiment molded to the respective corners of the receptacle and may be of any desired shape. However, it will be found that good strength and easy cleaning will be obtained by having said legs lying in, or at least close to and parallel with, the planes of the respective corners, namely in planes intersecting at or near the center of the receptacle.

The receptacle is further provided with depending flanges 16 and 17 at its respective ends, same preferably depending from the mutually remote edges of said ends and providing means for manually lifting said receptacle with a minimum of heat transfer to the hands of the person so lifting same.

Turning now to the cover, same is of a generally open box-shape having a top 21, with sides 22 and 23 and ends 26 and 27. Said sides and ends are positioned perpendicularly with respect to each other but are preferably positioned with respect to said cover at an angle slightly, such as about 3°-5° greater than 90° in order to define a prismatic truncated cone. The slope of said sides is, however, primarily a matter of appearance and may be made of virtually any desired angle without change in the effective functioning of the device.

At the lower extremity of the sides and ends, there projects a peripheral flange 28 having a downwardly extending lip 29 extending around its entire perimeter. At each of said ends 26 and 27, there is a recessed portion 31 and 32 formed by making said portions of said ends of a slope more nearly perpendicular than the slope of the adjacent portions of said ends whereby to render end portions 33 and 34 of said peripheral flange 28 of a width somewhat wider than the remainder of said flange. This provides hand holds for said cover 2. Each of said hand holds is provided with a plurality of projections 36 so as to reduce the area of contact between each of said hand holds and the hands of an operator in order thereby to minimize the transfer of heat from said cover to such operator's hands.

Figure 6:
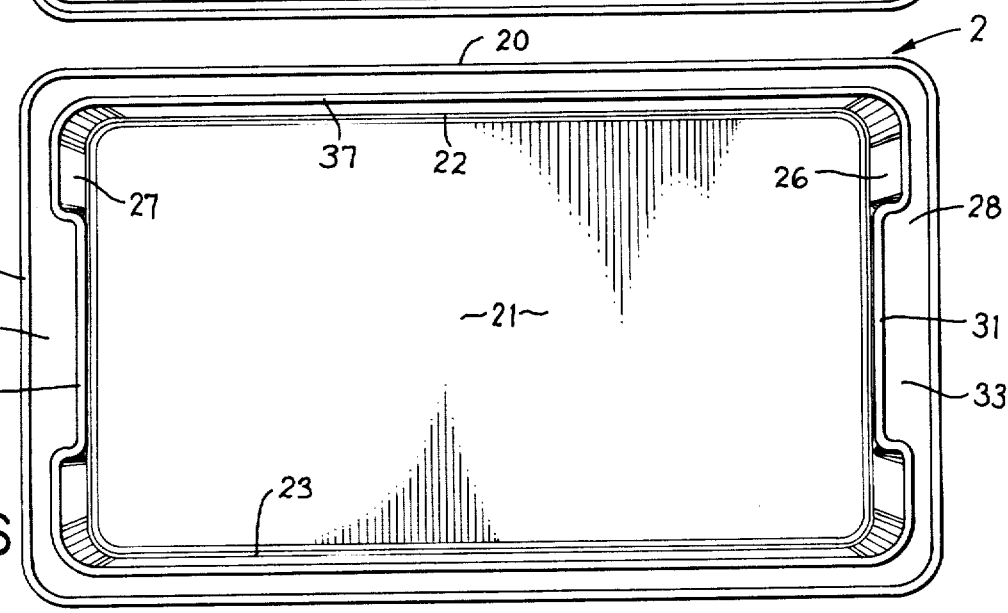
FIG. 6 is a bottom view of the cover component of said popcorn popper.

Surrounding the bottom edge of said cover at the inner edge of said flange 28 and preferably comprising a continuation of said ends 26 and 27 and said sides 22 and 23, is a small depending flange 37 which when said cover and base are assembled fits inside of and extends below the upper edge 38 of such base. This constitutes a drip flange by which liquids forming inside of said cover during the popping operation will be guided back into the base and will be prevented from dripping or otherwise escaping to the outside thereof. As will be seen upon reference particularly to FIG. 6, this flange extends around the entire perimeter of said cover at the inside edge of the flange 28 and thereby also around the entire perimeter of said base inside of said upper edge 38 thereof.

If desired, fins 41 may be provided at the top of said cover to constitute legs for holding said cover when same is inverted as hereinafter set forth and thereby to minimize heat transfer from said cover to a supporting surface such as a table.

Figure 3:
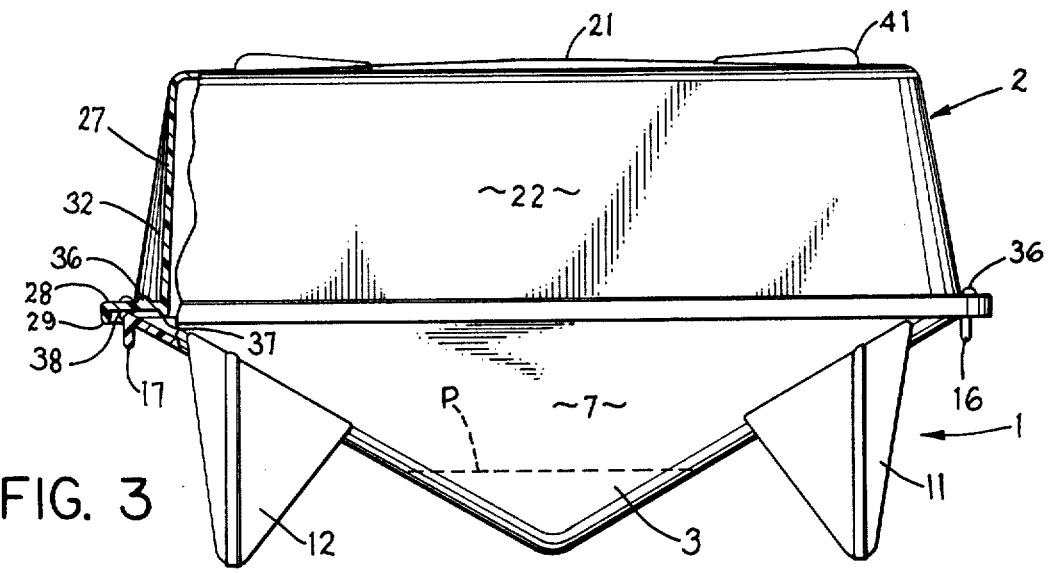
FIG. 3 is a partially broken side view of the assembly shown in FIG. 1 with the broken portion showing a section taken on the line III—III in FIG. 2.
Figure 7:
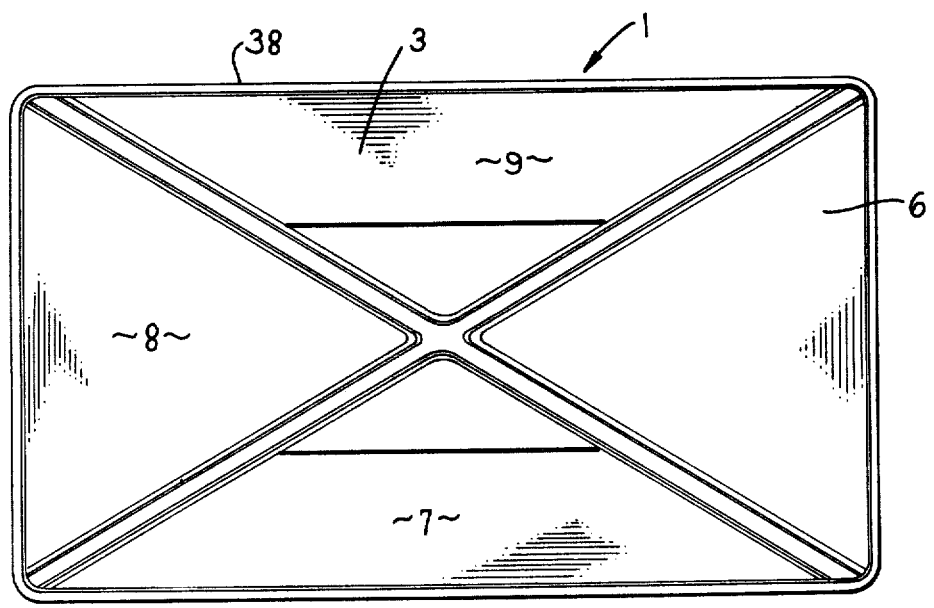
FIG. 7 is a top view of the bowl component of said assembly.
Figure 4:
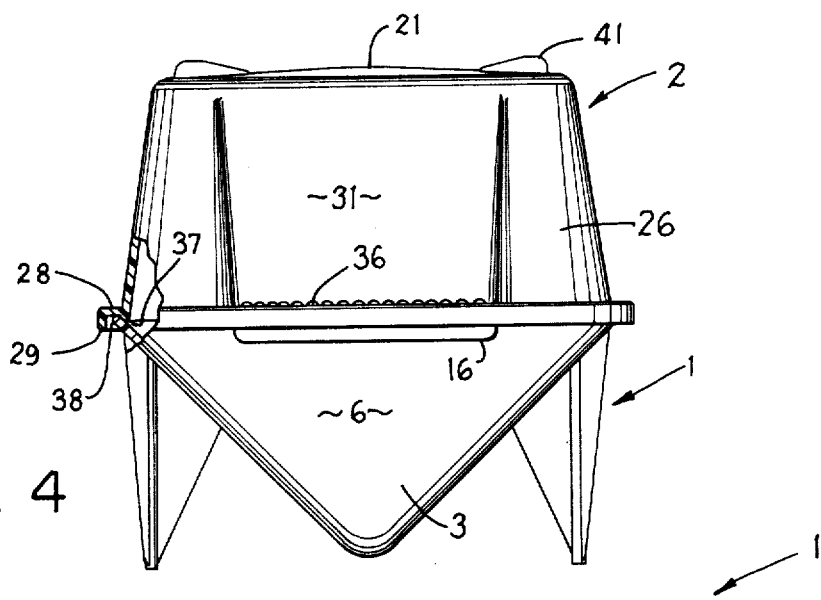
FIG. 4 is a partially broken end elevational view of the assembly shown in FIG. 1 with the broken portion showing a section taken on the line IV—IV of FIG. 2.
Figure 5:
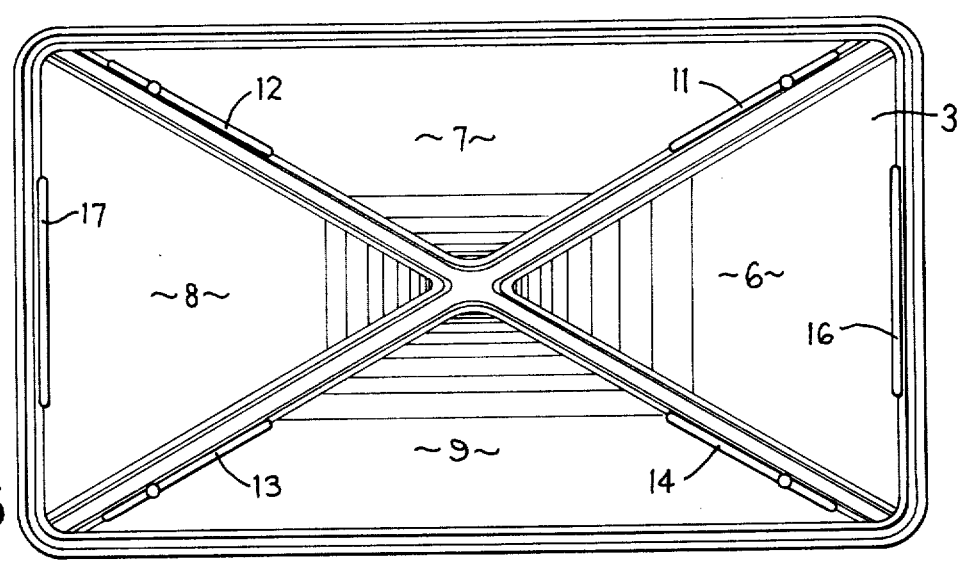
FIG. 5 is a bottom view of the assembly of FIG. 1.

In use, a selected quantity of popcorn kernels is placed in the bottom of the base as indicated in general by the broken line P in FIG. 3 and the cover placed into position as shown in FIGS. 1, 3 and 4. Same is then placed into a microwave oven for popping in a known manner. Upon completion of the popping operation, same is removed from the microwave oven and inverted so the cover is now resting upon the abovementioned fins 41. The base is then removed and the popcorn is accessible from the cover, now functioning as an open-topped dish, for direct use or for transfer to another container and further handling as desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A receptacle in which to pop corn in a microwave oven comprising:

bowl means having four first side walls converging downwardly substantially to a point and defining at their upper edges an elongated rectangular rim, said side walls comprising a material through which microwaves can pass freely;

leg means secured to said bowl means for supporting same;

cover means having a rectangular top wall and four downwardly extending second side walls comprising a material through which microwaves can freely pass, and having a rectangular support member at the lower edges of said second side walls, a downwardly facing surface on said rectangular support member snugly engageable with said rim on said bowl means and a pair of spaced, substantially parallel flanges extending around and projecting downwardly from said support surface, said rim being receivable between said flanges, whereby the innermost flange serves as a drip lip.

2. A receptacle according to claim 1, including handle means secured to the opposite ends of said bowl means adjacent said rim thereof.

3. The device defined in claim 2 wherein said handle means comprises a pair of flanges, each thereof positioned respectively at each end of said bowl means, molded integrally therewith and extending downwardly from said edges when said bowl means is in a position for popping popcorn.

4. A receptacle according to claim 1, wherein said rectangular member has a pair of upwardly facing grip surfaces at the opposite ends thereof, said grip surfaces having a plurality of closely spaced upwardly facing projections.

5. A receptacle according to claim 4, wherein said second side walls at the ends of said cover means each have a recessed portion adjacent the associated grip surface.

* * * * *